US012617576B2

(12) United States Patent
Holzer et al.

(10) Patent No.: US 12,617,576 B2
(45) Date of Patent: May 5, 2026

(54) VACUUM CYLINDER UNIT FOR TRANSFERRING LABELS

(71) Applicant: Krones AG, Neutraubling (DE)

(72) Inventors: Christian Holzer, Schierling (DE); Gundolf Kipper, Gebelkofen (DE)

(73) Assignee: Krones AG, Neutraubling (DE)

( * ) Notice: Subject to any disclaimer, the term of this patent is extended or adjusted under 35 U.S.C. 154(b) by 121 days.

(21) Appl. No.: 18/563,797

(22) PCT Filed: Apr. 14, 2022

(86) PCT No.: PCT/EP2022/059999
§ 371 (c)(1),
(2) Date: Nov. 22, 2023

(87) PCT Pub. No.: WO2022/248120
PCT Pub. Date: Dec. 1, 2022

(65) Prior Publication Data

US 2024/0270432 A1 Aug. 15, 2024

(30) Foreign Application Priority Data

May 26, 2021 (DE) ..................... 10 2021 113 498.6

(51) Int. Cl.
*B65C 9/02* (2006.01)
*B65C 9/18* (2006.01)

(52) U.S. Cl.
CPC ................ *B65C 9/188* (2013.01); *B65C 9/02* (2013.01)

(58) Field of Classification Search
CPC ......... B65C 9/188; B65C 9/02; B65C 9/1819; B65C 9/14
See application file for complete search history.

(56) References Cited

U.S. PATENT DOCUMENTS 6,347,657 B1 2/2002 Bright

FOREIGN PATENT DOCUMENTS

CN 101421162 A 4/2009
CN 101448708 A 6/2009
(Continued)

OTHER PUBLICATIONS

Search Report dated Feb. 14, 2022, in connection with German Application No. 10 2021 113 498.6, 10 pages.
(Continued)

*Primary Examiner* — Vishal I Patel

(57) ABSTRACT

The invention relates to a vacuum cylinder unit for transferring labels to containers in a vacuum-supported manner, and a labeling device equipped with said unit. The vacuum cylinder unit comprises a drive shaft and a vacuum cylinder which is coupled thereto in a centered and driving manner by means of a zero-point clamping system. Because the zero-point clamping system comprises a clamping pin which is integrated into the vacuum cylinder and a clamping chuck which is rigidly connected to the drive shaft for securing the clamping pin, the vacuum cylinder can be manually lifted off the drive shaft by a small vertical stroke and the majority of the weight of the zero-point clamping system can be moved into the region of the drive shaft. This also reduces the amount of equipment needed for the vacuum cylinder which is designed as a format-specific interchangeable part.

15 Claims, 4 Drawing Sheets

(56) References Cited

FOREIGN PATENT DOCUMENTS

| | | | | |
|---|---|---|---|---|
| CN | 101519141 | A | | 9/2009 |
| CN | 107108063 | A | | 8/2017 |
| DE | 1803877 | U | * | 1/1960 |
| DE | 4435363 | A1 | | 4/1996 |
| DE | 102005033468 | A1 | | 1/2007 |
| DE | 102010037545 | A1 | | 3/2012 |
| DE | 102011090190 | A1 | | 7/2013 |
| DE | 202013103475 | U1 | | 11/2014 |
| DE | 202013104148 | U1 | | 12/2014 |
| DE | 102013212132 | A1 | | 1/2015 |
| WO | 2016100620 | A1 | | 6/2016 |

OTHER PUBLICATIONS

Zero Clamp, General Catalogue, Version 4, 2019, 128 pages.

Zero Clamp, Zero point clamping system assembly and operating instructions, Sep. 22, 2017, 106 pages.

International Search Report and Written Opinion of the International Searching Authority dated Sep. 6, 2022, in connection with International Application No. PCT/EP2022/059999, 15 pages.

First Office Action dated Jul. 30, 2025, in connection with Chinese Application No. 202280036874.5. 16 pages.

* cited by examiner

VACUUM CYLINDER UNIT FOR TRANSFERRING LABELS

CROSS-REFERENCE TO RELATED APPLICATIONS

This application is a 371 National Stage of International Application No. PCT/EP2022/059999, filed Apr. 14, 2022, which claims priority to German Patent Application No. 102021113498.6, filed May 26, 2021, the disclosures of which are incorporated herein by reference.

TECHNICAL FIELD

The invention relates to a vacuum cylinder unit, and to a labeling device equipped with said unit for labeling containers.

BACKGROUND

Vacuum cylinder units are known components of labeling units for applying labels provided from rolls to containers, such as bottles, by means of hot-melt adhesive. The vacuum cylinder has the task here of transporting the labels provided with adhesive to the transport path of the containers in a vacuum-supported manner and transferring them to said containers.

The vacuum cylinder is matched to the labels in a format-specific manner and for a format change can be pulled off upwards from the associated rotary drive. With regard to a torque transmission and good concentricity accuracy, a combination of a drive shaft with a polygonal cross-section and a correspondingly positive-locking hub on the vacuum cylinder has proven effective for this purpose. The polygonal shaft then extends substantially over the entire height of the vacuum cylinder, so that it has to be lifted off over the entire length of the polygonal connection during the format change and thus has to be pulled from the drive shaft. Due to the relatively high weight of the vacuum cylinder and the generally restricted access during changeover work, this procedure is very unfavorable from an ergonomic point of view.

As a remedy, generic vacuum cylinder units have been proposed, for example in DE 10 2011 090 190 A1, DE 10 2013 212 132 A1 and DE 20 2013 103 475 U1, in which the polygonal shaft is replaced by a self-centering connection of a clamping pin to a clamping chuck. Such connections are also referred to as zero-point clamping systems. In the generic devices, the drive shaft has a comparatively short shaft stub at its upper end for this purpose, and the associated vacuum cylinder has a suitable clamping chuck which can be locked in a centering manner on the shaft stub.

It is true that to remove the vacuum cylinder the distance to be overcome manually during the format change can thereby be reduced compared to devices having polygonal shafts. However, the clamping chuck and the associated actuating mechanism increase the weight of the vacuum cylinder, thereby partially nullifying the ergonomic advantages in the lifting of the vacuum cylinder. In addition, the clamping chuck and the associated actuating mechanism increase the amount of equipment needed for the vacuum cylinder designed as an interchangeable part, which increases the cost of its purchase to an undesired extent.

The zero-point clamping systems of the generic vacuum cylinder units have therefore not yet become established, so that there is still a need to improve the ergonomics in the replacement of vacuum cylinders and thereby also to minimize as far as possible the costs for vacuum cylinders available in a format-specific manner.

SUMMARY

The stated object is achieved with a vacuum cylinder unit. Accordingly, said unit serves for vacuum-supported label transfer in a labeling device for containers and comprises a drive shaft and a vacuum cylinder coupled thereto in a centered and driving manner by means of a zero-point clamping system for transmitting torque. According to the invention, the zero-point clamping system comprises a clamping pin integrated into the vacuum cylinder and a clamping chuck connected to the drive shaft for securing the clamping pin.

The clamping pin is the passive component in the zero-point clamping system, the clamping chuck is the actively closing/opening component. All components to be actuated for opening/closing the zero-point clamping system can thus be moved into the region of the drive shaft that is not to be exchanged during the format change. Consequently, the comparatively heavy and expensive clamping chuck with the associated actuating elements does not have to be lifted/replaced when the vacuum cylinder is being replaced, so that the ergonomics are improved and a comparatively favorable design of the vacuum cylinder becomes possible.

In other words, the clamping pin arranged on the replaceable vacuum cylinder is comparatively lightweight and cost-effective.

Suitable zero-point clamping systems are known, for example, under the name “Zero Clamp®” and generally comprise a clamping chuck housing made of hardened stainless steel, a steel cone for play-free clamping of the associated pin, an associated precision radial spring, a spring leaf, and preferably a locking mechanism, which closes by means of spring force and can be pneumatically opened.

The clamping chuck preferably comprises a spring-loaded pretensioned locking mechanism which can be pneumatically opened, i.e., by applying compressed air. The spring force keeps the connection reliably closed even in the absence/failure of the compressed air supply. This means that the clamping pin is inserted into the clamping chuck when compressed air is applied, and the force-locking connection is produced by interrupting the supply of compressed air and is thus mechanically held until the compressed air is applied again. An ergonomic opening is thus provided by a temporary compressed air supply when the vacuum cylinder is at a standstill.

Preferably, the vacuum cylinder unit further comprises a stationary lower part in which a compressed air duct for supplying compressed air and a groove upwardly open to the vacuum cylinder is formed with a coupling element that can be moved vertically therein. The coupling element is formed such that in the absence of a supply of the compressed air it is not in contact with any components that are rotating in working mode in the groove and when the compressed air is supplied is lifted off such that it docks at a pneumatic connection at the clamping chuck for the pneumatic opening thereof. In the docked state, the coupling element rests against a component rigidly connected to the clamping chuck and thus rotating in working operation, the said component having a pneumatic connection to the clamping chuck and thus connects the compressed air duct to the clamping chuck.

As a result, it is possible in a comparatively simple manner for the coupling element not to come into contact with rotating components of the vacuum cylinder unit during working operation, i.e., when the vacuum cylinder is rotating. The coupling element, which is driven by gravity in the groove, is thus located in an inactive position, from which it can be lifted into an active position for compressed air transfer to the vacuum cylinder by temporary application of the compressed air when the vacuum cylinder is stationary.

For this purpose, the coupling element has, for example, suitable grooves and/or holes which establish a pneumatic connection between the groove (input side), to which compressed air is applied, and a connection duct (output side) leading to the clamping chuck.

The coupling element and the groove on the input side in this respect preferably run around the entire circumference of the axis of rotation of the vacuum cylinder in an annular shape in such a way that the clamping chuck can be connected to the compressed air duct independently of the rotational position of the vacuum cylinder relative to the base frame. This additionally simplifies the replacement of the vacuum cylinder.

Alternatively, however, the input-side groove and the coupling element could also be designed to be only partially circumferential, i.e., over a predetermined machine angle range. In this case, the vacuum cylinder must be rotated relative to the base frame into a predefined rotational position before the compressed air can be applied to the clamping chuck. For this purpose, suitable markings could, for example, be provided on the vacuum cylinder and base frame.

Preferably, an output-side groove downwardly open is formed on the underside of a support plate rigidly connected to the clamping chuck, at which groove the coupling element can dock on the output side when the compressed air is supplied in order to produce the pneumatic connection to the clamping chuck via the output-side groove. This favors a compressed air supply to the clamping chuck which is independent of the rotational position of the vacuum cylinder relative to the base frame.

The output-side groove is then preferably designed to extend annularly around the axis of rotation of the vacuum cylinder over the full circumference.

The vacuum cylinder unit preferably comprises an external compressed air connection for the tool-free coupling of a pressure hose, in particular to an air pressure gun attached thereto or similar valve. Manual coupling of the pressure hose makes the supply of compressed air possible in a targeted manner when the vacuum cylinder is stationary. A permanent compressed air supply for the compressed air duct is then unnecessary.

Preferably, indexing holes and/or indexing pins circumferentially surrounding the clamping pin are formed on the vacuum cylinder for specifying the rotational position of the vacuum cylinder relative to the drive shaft. This means that the relative rotational position of the vacuum cylinder can be precisely configured by the indexing holes and/or indexing pins, while the torque is transmitted to the vacuum cylinder via the closed zero-point clamping system.

Preferably, the clamping chuck is designed to be opened by application of compressed air at a pressure of 4 to 8 bar. This enables a comparatively simple and ergonomic opening of the zero-point clamping system by means of a conventional central compressed air supply.

Preferably, the clamping chuck further comprises an opening mechanism for opening when application of compressed air is absent. The opening mechanism then serves for any manual forced opening of the zero-point clamping system that may be required, for example in the form of a screw mechanism.

Preferably, the clamping pin has an engagement length of 10 to 50 mm relative to the clamping chuck. This means that the engagement length has to be overcome with a manual stroke when the vacuum cylinder is being lifted from the drive. A relatively ergonomic removal of the vacuum cylinder is thus provided.

The stated object is also achieved by a labeling device and a labeling machine. The labeling device serves by definition for labeling containers, in particular bottles, and for this purpose comprises a vacuum cylinder unit arranged for the direct transfer of labels to the containers according to at least one of the described embodiments. The labeling device is designed, for example, for the all-round labeling of the containers by means of labels provided from the roll and then coated with hot-melt adhesive. The labeling device is then a hot-adhesive labeling assembly. However, it can also be a cold-adhesive labeling assembly for containers.

The labeling machine comprises the described labeling device and a continuously rotatable container carousel for positioning the containers during the label transfer.

BRIEF DESCRIPTION OF THE DRAWINGS

A preferred embodiment of the invention is illustrated in the drawing. In the figures.

DETAILED DESCRIPTION

Figure 1:
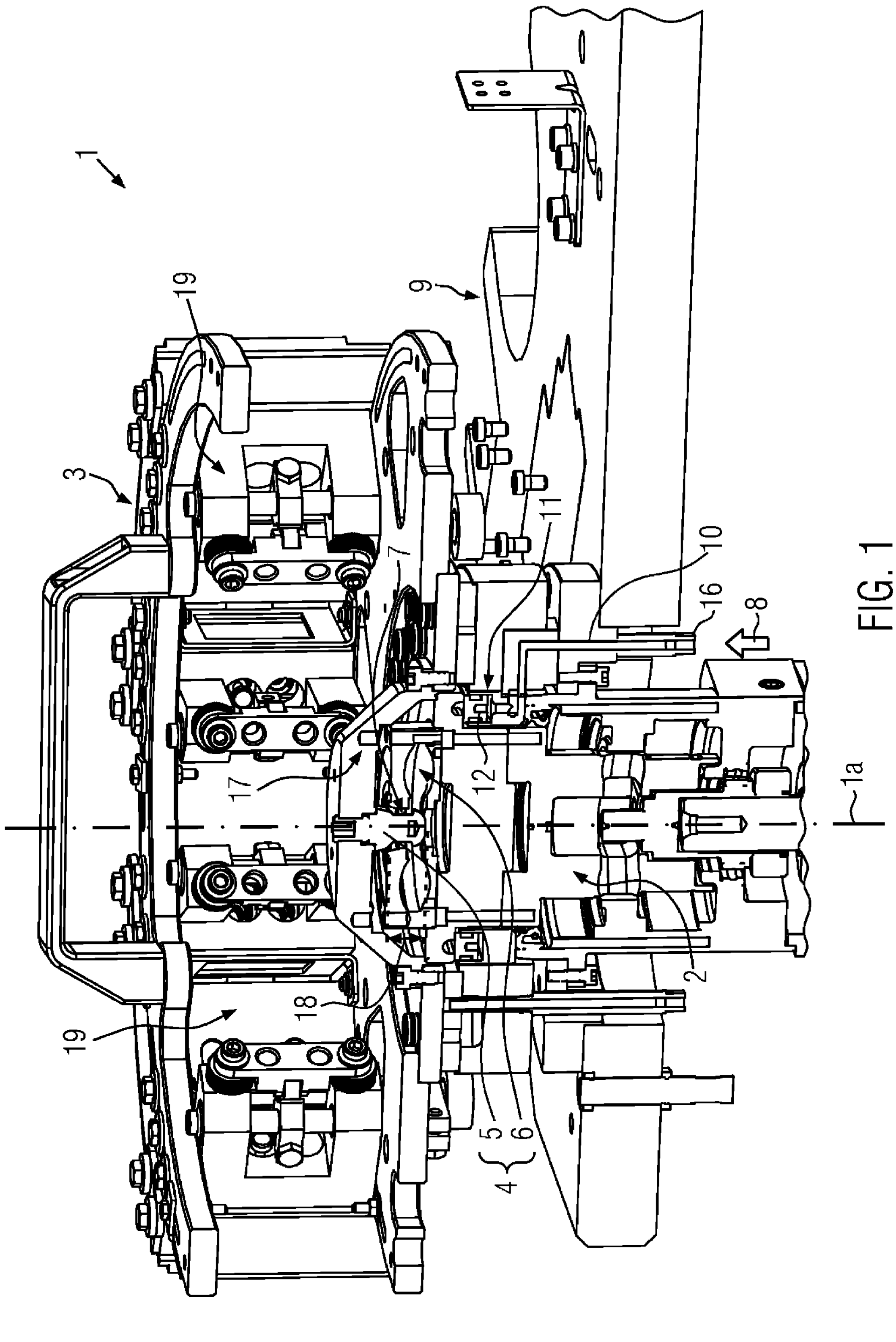
FIG. 1 shows a section through the vacuum cylinder unit.

As can be seen in FIG. 1, in a preferred embodiment the vacuum cylinder unit 1 comprises a drive shaft 2 and a vacuum cylinder 3, which are centered with respect to an axis of rotation 1*a* by means of a zero-point clamping system 4 and are coupled to one another so as to transmit torque.

The zero-point clamping system 4 comprises a clamping pin 5, which is fastened to the vacuum cylinder 3 and which points downwards during working operation, and a clamping chuck 6, which is rigidly connected to the drive shaft 2, for securing the clamping pin 5 by gripping it.

The clamping chuck 6 comprises a spring-loaded pretensioned locking mechanism 7 which can be pneumatically opened by applying compressed air 8, as is known, for example, from the System Zero Clamp®.

Figure 2:
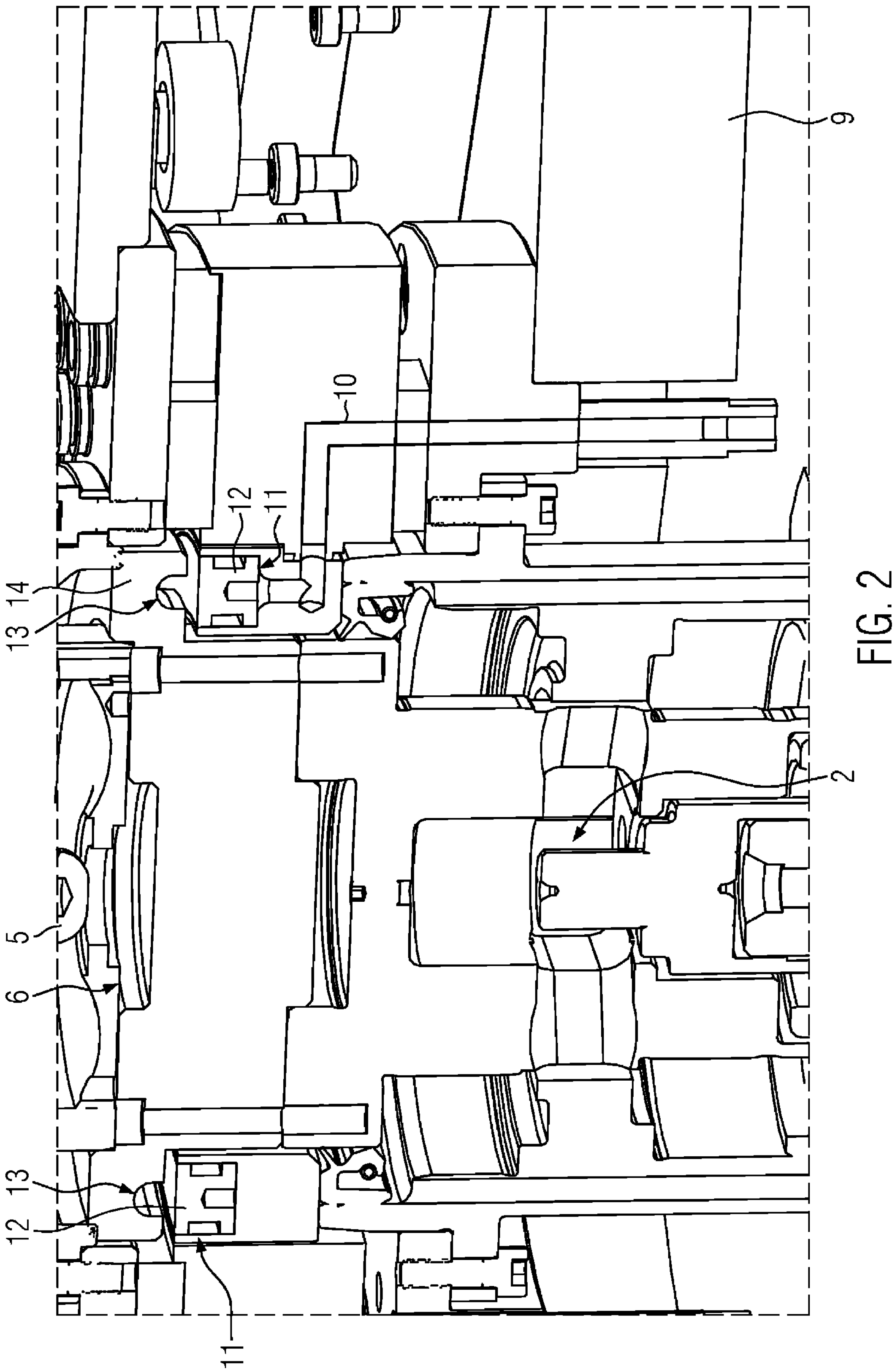
FIG. 2 shows a partial region of the vacuum cylinder unit when the coupling element is inactive.
Figure 3:
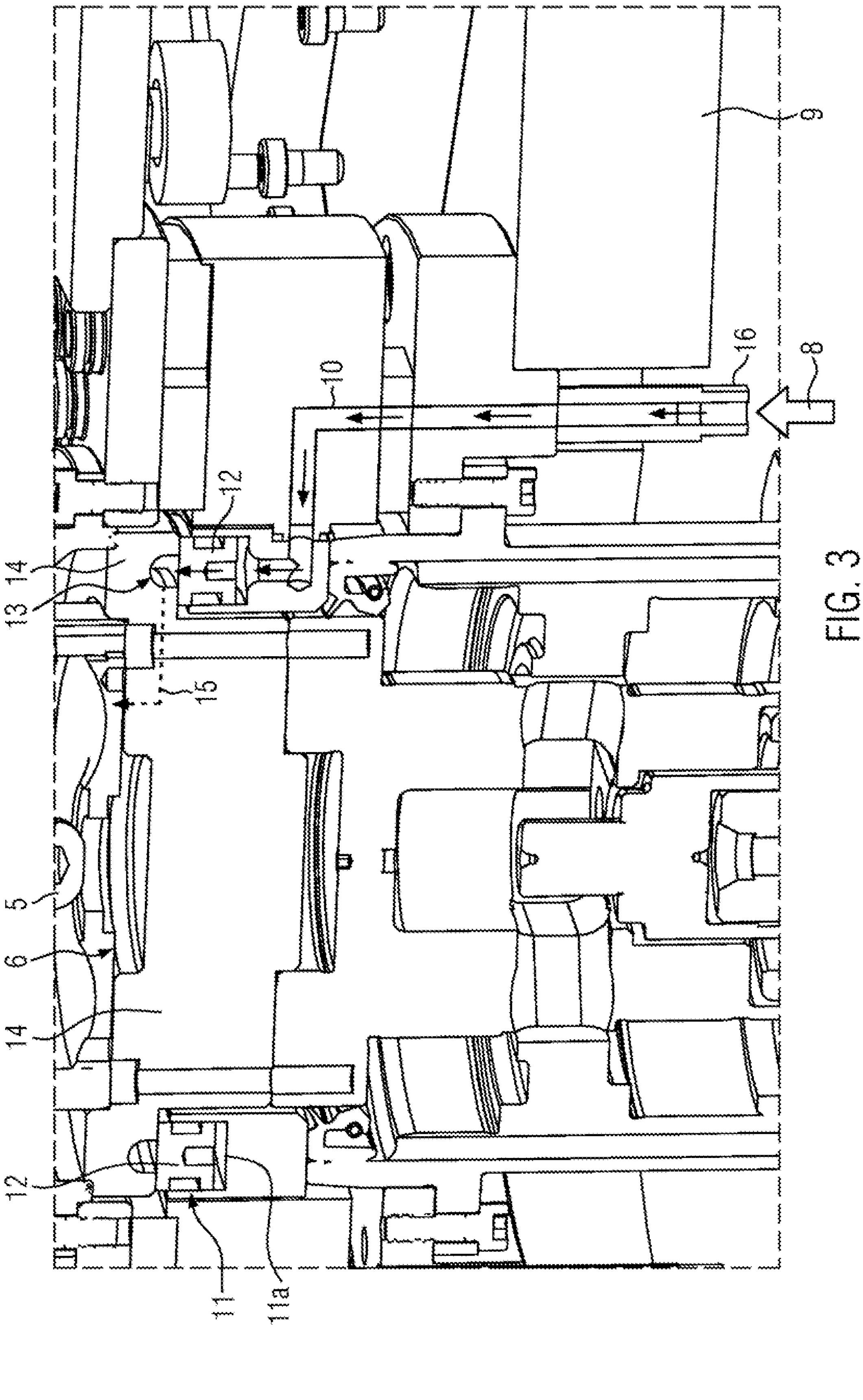
FIG. 3 shows the partial region with docked coupling element.

The vacuum cylinder unit 1 further comprises a stationary lower part 9 in which a compressed air duct 10 for supplying the compressed air 8 and a groove 11 open at the top toward the vacuum cylinder 3 is formed with a coupling element 12 which is vertically movable therein and is annularly formed around the entire circumference; see the representations detailed in this respect in FIGS. 2 and 3.

As can be seen in FIG. 2, the coupling element 12 is arranged in the groove 11 on the input side with respect to the compressed air supply in such a way that, without the compressed air 8 being applied to the input-side groove 11, it rests on the bottom 11*a* of the input-side groove 11 by the force of gravity and during working operation does not touch rotating components of the vacuum cylinder unit 1 arranged above it.

As shown in FIG. 3, the coupling element 12 is designed in such a way that, when compressed air 8 is applied to the input-side groove 11, it is lifted to such an extent that the coupling element 12 produces a pneumatic connection from the input-side groove 11 to a groove 13 arranged above the coupling element 12 and on the output side in relation thereto.

The output-side groove 13 is formed in a support plate 14 that is downwardly open, which plate is rigidly and permanently connected to the clamping chuck. The support plate 14 is also rigidly connected to the drive shaft 2 and consequently rotates during the working operation of the vacuum cylinder unit 1.

The compressed air 8 is supplied only when the vacuum cylinder unit 1 is stationary, so that the coupling element 12 can pneumatically dock at the then non-rotating support plate 14. In unpressurized working operation, the coupling element 12 in this respect rests against the bottom of the groove 11 and then does not touch the support plate 14.

In the support plate 14, at least one connecting line 15 (indicated only schematically) is formed between the output-side groove 13 and a compressed air connection (not shown) of the clamping chuck 6. Accordingly, the compressed air 8 applied to the input-side groove 11 can reach the clamping chuck 6 via the coupling element 12, the output-side groove 13 and the connection duct 15 in order to pneumatically open it.

In the coupling element 12, suitable grooves and/or holes (in each case not shown) could be formed, which on the one hand offer sufficient flow resistance to the compressed air 8 to lift the coupling element 12 and on the other hand enable sufficient passage of the compressed air 8 from the input-side groove 11 into the output-side groove 13 to pneumatically open the clamping chuck 6.

The input-side and output-side grooves 11, 13 and the coupling element 12 between them are preferably in each case annular in shape in order to enable the clamping chuck 6 to be acted upon with the compressed air 8 even independently of the rotational position of the support plate 14 and the vacuum cylinder 3 still coupled thereto with respect to the base frame 9. That is to say, the vacuum cylinder 3 can be pulled off upwards in any rotational position relative to the base frame 9 with a suitable application of compressed air to the clamping chuck 6. This enables an ergonomic handling of the vacuum cylinder 3 during format-specific replacement.

In principle, however, it would also be conceivable to form the input-side groove 11, the output-side groove 13 and/or the coupling ring 12 arranged therebetween only partially circumferentially or over a certain machine angle range (not shown), which is why the support plate 14 with the vacuum cylinder 3 must then be brought first into a rotary position suitable for the mutual alignment of the grooves 11, 13 relative to the base frame 9, before the compressed air 8 can be applied and the clamping chuck 6 can thereby be opened.

For supplying the compressed air 8, the support frame 9 preferably comprises an external compressed air connection 16 to which, for example, a compressed air hose (not shown) can be connected. For example, an air pressure gun or similar valve could be present on the pressure hose in order to manually trigger and terminate again the temporary supply of the compressed air 8.

As indicated in FIG. 1, indexing pins and/or indexing holes 17 surrounding the clamping pin 5 can be present in the region of the zero-point clamping system 4, for example on the vacuum cylinder 3, in order to fix the rotational position of the vacuum cylinder 3 relative to the drive shaft 2. In the region of the clamping chuck 6, corresponding openings and/or pins are thereby provided. This indexing then serves only to fix the relative rotational positions relative to one another, while the torque transmission between drive shaft 2 and vacuum cylinder 3 is effected by the zero-point clamping system 4, i.e., the force-fitting connection between clamping pin 5 and clamping chuck 6.

The zero-point clamping system 4 preferably automatically closes by means of spring pretensioning, but could in principle additionally be tightened mechanically. For separating and putting together the zero-point clamping system 4, said system is pneumatically opened, for example by applying an air pressure of 4 to 8 bar to the input-side groove 11. By pressure relief, the zero-point clamping system 4 locks in a centering and force-fitting manner by itself and remains permanently locked without the renewed application of pressure.

Preferably, the clamping chuck 6 further comprises an opening mechanism for the forced opening (not shown) of the zero-point clamping system 4 in the absence of an application of compressed air suitable for this purpose. As a result, the vacuum cylinder 3 can even be replaced if the compressed air 8 is not available.

The clamping pin 5 preferably has an engagement length 18 to be overcome during lifting of at most 50 mm with respect to the clamping chuck 6 in order to enable an ergonomic replacement of the vacuum cylinder 3.

For the sake of completeness, it should also be mentioned that suction elements 19 known in principle on the vacuum cylinder 3 are arranged uniformly distributed for receiving/dispensing labels.

Figure 4:
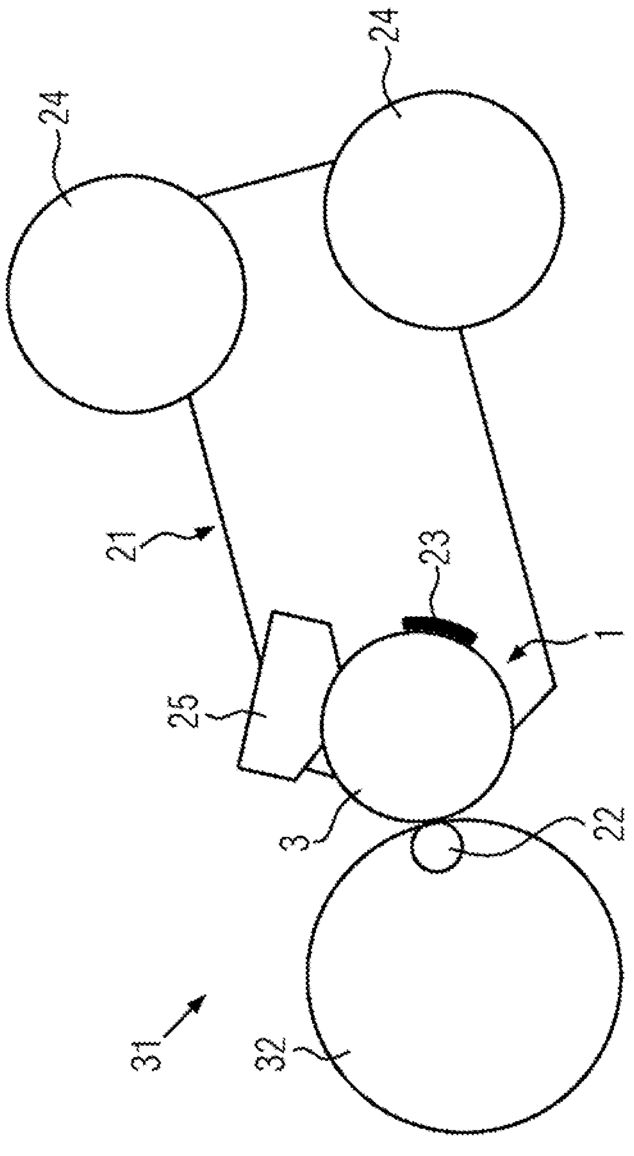
FIG. 4 is a schematic plan view of a labeling device.

FIG. 4 shows, by way of example and schematically, a labeling device 21 for labeling containers 22 (only one shown), In particular bottles, with which, for the direct transfer of labels 23 (only one shown) to the containers 22, the vacuum cylinder unit 1 is arranged with an exchangeable vacuum cylinder 3.

The labels 23 are provided, for example, from rolls 24 and coated by a gluing unit 25 with hot-melt adhesive. The labeling device 21 shown is thus preferably a hot-adhesive labeling assembly.

Alternatively, a corresponding coupling of a vacuum cylinder unit 1, but also in the case of a cold-adhesive labeling assembly (not shown), would be conceivable, and/or, in the case of gripper cylinders, transfer cylinders or the like, rotating units which would have to be replaced in their entirety on labeling devices in a format-dependent manner.

The labeling device 21 is then preferably a component of a labeling machine 31 which comprises a continuously rotatable container carousel 32 for positioning the containers 22 during the label transfer, and at least one labeling device 21 docked in a manner known in principle at the periphery of the container carousel 32.

The described arrangement of the zero-point clamping system 4 with clamping pin 5 arranged on the vacuum cylinder 3 and with clamping chuck 6 arranged on the drive shaft 2 enables an ergonomic replacement of the vacuum cylinder 3 in the event of format changes and also reduces the costs for the individual vacuum cylinders 3 to be kept available in a format-specific manner.

For the exchange of the vacuum cylinder 3, the motor connected to the drive shaft 2 is switched off and the vacuum cylinder unit 1 is brought to a standstill, i.e., without a running rotary drive.

As soon as the vacuum cylinder 3 is no longer rotating, the compressed air 8 can be applied, for example, at the external compressed air connection 16 and the coupling element 12 can thereby be lifted from the bottom of the groove 11 and docked to the output-side groove 13 located above it. As a result, the compressed air 8 flows via the input-side groove 11 and the coupling ring 13 into the output-side groove 13 and from there via at least one connection duct 15 to the clamping chuck 6.

The compressed air 8 applied there opens the clamping chuck 6 in such a way that the clamping pin 5 can be released and the vacuum cylinder 3 can be lifted upward from the drive shaft 2.

While compressed air 8 continues to be applied, a suitable vacuum cylinder 3 can be set in place for another label format by inserting its clamping pin 5 into the clamping chuck 6.

The clamping pin 5 is then mechanically secured in the clamping pin 6 by spring pretensioning and locked thereby in a torsionally rigid manner.

That is to say, when the clamping pin 5 is inserted into the clamping chuck 6, it is acted upon with the compressed air 8 and thus opened. By switching off the supply of compressed air, the clamping chuck 6 automatically closes around the clamping pin 5 by means of spring pretensioning.

For the correct assignment of the rotational position of the vacuum cylinder 3 to the drive shaft 2, indexing pins and/or indexing holes 17 present on the vacuum cylinder 3 are preferably brought into engagement with corresponding structures in the region of the clamping chuck 6. The torque required during working operation is then transferred by the force-fit of the zero-point clamping system 4 from the drive shaft 2 to the vacuum cylinder 3.

The absolute rotational position of the drive shaft 2/of the clamping chuck 6 can thereby be freely selected thanks to the pressure coupling over the full circumference on the coupling element 12.

After the zero-point clamping system 4 is closed by switching off the supply of compressed air, the vacuum cylinder unit 1 and the labeling device 21/labeling machine 31 associated therewith can resume working operation.

Although the present disclosure has been described with various embodiments, various changes and modifications may be suggested to one skilled in the art. It is intended that the present disclosure encompass such changes and modifications as falling within the scope of the claims.

The present disclosure should not be read as implying that any particular element, step, or function is an essential element, step, or function that must be included in the scope of the claims. Moreover, the claims are not intended to invoke 35 U.S.C. § 112(f) unless the exact words "means for" are followed by a participle.

The invention claimed is:

1. A vacuum cylinder unit for transferring labels to containers in a vacuum-supported manner in a labeling device for containers, the vacuum cylinder unit comprising:
- a drive shaft; and
- a vacuum cylinder coupled to the drive shaft in a centered and driving manner by a zero-point clamping system, wherein the zero-point clamping system comprises:
  - a clamping pin integrated into the vacuum cylinder; and
  - a clamping chuck, wherein the clamping chuck is rigidly connected to the drive shaft for securing the clamping pin, and wherein the clamping chuck comprises a spring-loaded pretensioned locking mechanism which can be pneumatically opened.

2. The vacuum cylinder unit of claim 1, further comprising a stationary lower part in which a compressed air duct is formed for supplying compressed air and a groove open at a top of the stationary lower part is formed with a coupling element that can be moved vertically therein, wherein the coupling element is formed such that with no supply of compressed air it lies in the groove with no contact with any components that are rotating in working mode and when the compressed air is supplied it is lifted off the groove such that it docks at a pneumatic connection for the clamping chuck to the pneumatic opening thereof.

3. The vacuum cylinder unit of claim 2, wherein the coupling element and the groove on an input side run around an entire circumference of an axis of rotation of the vacuum cylinder in an annular shape in order to connect the clamping chuck to the compressed air duct independently of a rotational position of the vacuum cylinder relative to a base frame.

4. The vacuum cylinder unit of claim 3, wherein an output- side groove that is open at a bottom of the output-side groove is formed on an underside of a support plate which is rigidly connected to the clamping chuck and at which the coupling element can dock when the compressed air is supplied in order to produce the pneumatic connection to the clamping chuck via the output-side groove.

5. The vacuum cylinder unit of claim 4, wherein the output- side groove is annularly formed about the axis of rotation of the vacuum cylinder over the entire circumference.

6. The vacuum cylinder unit of claim 1, further comprising an external compressed air connection for supplying compressed air by a pressure hose.

7. The vacuum cylinder unit of claim 4, wherein indexing holes and/or indexing pins circumferentially surrounding the clamping pin are formed on the vacuum cylinder for specifying a relative rotational position of the vacuum cylinder relative to the drive shaft.

8. The vacuum cylinder unit of claim 1, wherein the clamping chuck is designed for the pneumatic opening of the zero-point clamping system by application of compressed air at a pressure of 4-8 bar.

9. The vacuum cylinder unit of claim 8, wherein the clamping chuck further comprises an opening mechanism for a forced opening of the zero-point clamping system when the compressed air is not being applied.

10. A vacuum cylinder unit for transferring labels to containers in a vacuum-supported manner in a labeling device for containers, the vacuum cylinder unit comprising:
- a drive shaft; and
- a vacuum cylinder coupled to the drive shaft in a centered and driving manner by a zero-point clamping system, wherein the zero-point clamping system comprises:
  - a clamping pin integrated into the vacuum cylinder; and
  - a clamping chuck, wherein the clamping chuck is rigidly connected to the drive shaft for securing the clamping pin, wherein the clamping pin has an engagement length of 10 to 50 mm relative to the clamping chuck.

11. The vacuum cylinder unit of claim 1, further comprising a stationary lower part in which a compressed air duct is formed for supplying compressed air and a groove open at a top of the stationary lower part is formed with a coupling element that can be moved vertically therein, wherein the coupling element is formed such that with no supply of compressed air it lies in the groove with no contact with any components that are rotating in working mode and when the compressed air is supplied it is lifted off the groove such that it docks at a pneumatic connection for the clamping chuck to a pneumatic opening thereof.

12. The vacuum cylinder unit of claim 11, wherein an output-side groove that is open at a bottom of the output-side groove is formed on an underside of a support plate which is rigidly connected to the clamping chuck and at which the coupling element can dock when the compressed air is supplied in order to produce the pneumatic connection to the clamping chuck via the output-side groove.

13. The vacuum cylinder unit of claim 12, wherein the output-side groove is annularly formed about an axis of rotation of the vacuum cylinder over an entire circumference of the axis of rotation.

14. The vacuum cylinder unit of claim 6, wherein the pressure hose has an air pressure gun connected thereto.

15. A vacuum cylinder unit for transferring labels to containers in a vacuum-supported manner in a labeling device for containers, the vacuum cylinder unit comprising:

a drive shaft; and a vacuum cylinder coupled to the drive shaft in a centered and driving manner by a zero-point clamping system, wherein the zero-point clamping system comprises:

a clamping pin integrated into the vacuum cylinder; and a clamping chuck, wherein the clamping chuck is rigidly connected to the drive shaft for securing the clamping pin, wherein indexing holes and/or indexing pins circumferentially surrounding the clamping pin are formed on the vacuum cylinder for specifying a relative rotational position of the vacuum cylinder relative to the drive shaft.

* * * * *